United States Patent [19]

Phillips

[11] 4,117,645
[45] Oct. 3, 1978

[54] METHOD FOR HANDLING AND TRANSPORTING THERMOPLASTIC MATERIALS

[75] Inventor: Michael Phillips, Pittstown, N.J.

[73] Assignee: L.A. Dreyfus Company, Plainfield, N.J.

[21] Appl. No.: 826,036

[22] Filed: Aug. 19, 1977

[51] Int. Cl.² .............................................. B65B 3/00
[52] U.S. Cl. ...................................... 53/431; 53/472; 53/239; 264/142; 426/5; 426/402
[58] Field of Search .................. 53/21 R, 36, 239; 206/205; 264/141, 142; 426/3–6, 402

[56] References Cited

U.S. PATENT DOCUMENTS

| | | | |
|---|---|---|---|
| 3,777,447 | 12/1973 | Herbine et al. | 53/36 |
| 3,892,834 | 7/1975 | Pritchard | 264/142 |

*Primary Examiner*—Travis S. McGehee
*Attorney, Agent, or Firm*—LeBlanc & Shur

[57] ABSTRACT

An improved method for handling and transporting thermoplastic materials such as chewing gum base is disclosed. Chewing gum base, formulated as a hot viscous blend, is initially extruded and then pelletized. The pellets are subsequently cooled in a liquid medium such as water. Instead of drying the pellets and coating the pellets with a lubricating powder for packaging and shipment, a slurry of the cooling medium and pellets is conveyed to bulk containers or railroad tank cars for transport to the customer-user, a chewing gum manufacturer. By transporting in a liquid the tendency of the tacky pellets to agglomerate is eliminated, and the prior steps of drying and coating the pellets with a lubricating power are unnecessary. The customer-user, in the case of chewing gum base, furthermore, does not have to separate agglomerated pellets before use, and the pellets need only be strained and conveyed directly to a blender for formulation into chewing gum compositions.

7 Claims, 2 Drawing Figures

METHOD FOR HANDLING AND TRANSPORTING THERMOPLASTIC MATERIALS

This invention relates to an improved method for handling and shipping thermoplastic materials, such as natural and man-made resins, gums, elastomers, waxes and compounds thereof. In a preferred embodiment of this invention an improved and efficient method for handling and shipping chewing gum base for formulation into chewing gum compositions is described.

Certan thermoplastic materials formulated in a molten, viscous state are not stable in the molten state for extended periods of times. It is necessary, therefore, to cool and solidify these materials after formulation for shipping and storage. However, solidified materials such as chewing gum base, and certain similar materials, present difficult storage and handling problems. For example, the solid material may be subject to cold flow whereby if storage units are stacked on top of each other, the weight of the stack will deform the lower units. More importantly, however, unless refrigerated, ambient temperature increases, as during the summer months, can cause partial melting and increased tackiness which will then require expensive and time-consuming separation and handling procedures before the material may be processed.

Chewing gum base is typically manufactured and then shipped to chewing gum manufacturers who blend it with various ingredients to formulate the commercial product. Prior to this invention, base was shipped either in pan-molded or extruded blocks, or as pellets packed in plastic lined cartons or sealed in containers. Both methods require expensive and time-consuming handling techniques, including manual procedures, in order to ship the materials from the chewing gum base manufacturer to the chewing gum composition manufacturer, and to prepare the shipped materials for blending into chewing gum formulations.

Machines for forming and handling blocks or slabs of chewing gum base, or the solid resin component thereof, are disclosed in my prior U.S. Pat. Nos. 3,455,755; 3,644,169; 3,706,419; and 3,779,410. In my U.S. Pat. Nos. 3,455,755 and 3,644,169, a machine and method for producing laminated slabs of chewing gum base is described. In this method an extruded ribbon of viscous chewing gum base is folded on a shipping pallet to form a laminated block. In my U.S. Pat. No. 3,779,410, a machine for automatically unloading chewing gum base cast in pans or trays is described. In my U.S. Pat. No. 3,706,419, a machine for removing friable resin material from containers for use in formulating chewing gum base is described.

The aforementioned patents are directed to minimizing or eliminating manual labor associated with handling or transporting slabs or blocks of chewing gum base, or similar materials. However, in the case of chewing gum base, the blocks or slabs are subject to cold flow deformation, and unless stored under refrigerated conditions may tend to melt and become tacky. Furthermore, these blocks may weigh 50 pounds or more. If the molten gum base is cast in individual pans, trays, or molds, and left to cool, the molds may require an anti-sticking coating and considerable hand labor to clean the molds for reuse.

In order to formulate blocks or slabs of chewing gum base into chewing gum compositions, the blocks must be broken into small particles by milling or crushing before they may be admitted to a blender for processing into chewing gum compositions. In the alternative, the blocks may be extruded and pelletized by the chewing gum manufacturer prior to blending. However, as noted above, expensive machinery and time-consuming handling techniques are necessary in order to formulate the viscous hot chewing gum base into the blocks or slabs for shipping, by the base manufacturer, and for processing the blocks or slabs into usable sized particles for formulation into chewing gum compositions by the gum manufacturer.

In the alternative, it is known in the art to pelletize the chewing gum base prior to shipment, in sized particles usable by the gum manufacturer. The hot viscous melt may be pelletized by flowing through an orifice into a cooling liquid where the resultant strand is pulled through the liquid until cooled sufficiently to pass through a pellet cutting head. In the alternative, the hot viscous melt may be cooled in, for example, a scraped surface heat exchanger and extruded through a diehead in the presence of a liquid and cut by a rotary blade.

The resulting pellets are then dried by, for example, agitation and air drying and delivered to a tumbler or dry mixer. In the dry mixer the pellets are coated with, for example, calcium carbonate powder to absorb the remaining water on the surface thereof. The powder adheres to the surface of the pellets to provide a less tacky surface to avoid pellets sticking to each other. The pellets may then be packed in boxes within plastic bag liners or in drums adapted to be sealed with a gasket at the rim to keep out ambient moisture and air born contaminates. Pellet containers may hold from 35 to 200 pounds of pellets.

Each container is then individually weighed, sealed, and palletized, and each pallet may contain 800 to 1,500 pounds of pellets. Shipping carton quantities must be batch weighed, which is essentially a non-productive operation, in that the customer-user must redivide the product into smaller units of weight at the point of use.

At the point of use, it is intended that the pellet containers will be opened, emptied and pneumatically conveyed to a blender for formulation into a chewing gum composition. However, in spite of the individual powder coating and sealed containers, the pellets tend to agglomerate.

Agglomeration is promoted when the pellets, in shipment, are subjected to impacts or vibration, and also by the pressure within the container due to the depth of product. While this feature may be alleviated by limiting the size or the height of the containers, subjecting the pellets to ambient temperatures also promotes agglomeration. In order to effectively prevent sticking, it is necessary to maintain the pellets under refrigeration not to exceed about 5° C. As the temperature rises, the tendency to stick together increases, and even at normal room temperatures of 25°–30° C. a significant amount of agglomeration occurs in normal storage periods of from 2 to 5 months. Shipping during summer months can significantly increase agglomeration problems, in that temperatures within trucks and railroad cars may reach 50°–60° C. At these temperatures actual softening occurs and the pellets may fuse to the walls of the container as well as to each other.

The powder coating used to attempt to minimize the tendency to agglomerate or the tackiness of the pellets is normally an extender material utilized in the chewing gum formulation. In the case of thermoplastic materials which do not utilize such materials, the product may not be handled in pellet form, but must be cast in large solid, less convenient blocks.

In the case of chewing gum base, the powder utilized, preferably calcium carbonate, must be uniformly coated on the pellets. If a non-uniform coating is applied, or if powder settles to the bottom of the containers and does not follow the pellets to the point of use, the exact concentration will vary. In addition, seasonal changes must be accounted for in varying the proportions of powder utilized as a coating. Accordingly, the powder coating can account for unacceptable variations in concentration which will cause difficulties in formulating the end product. In addition, the application of the powder requires an elaborate dust collection system at points of packaging, unpackaging, and final use. Furthermore, powder left behind at any point of handling may later be released in a surge, increasing the powder concentration in the formulation.

In summary, then, conventional techniques utilized in shipping and handling of dry, powder coated pellets, are expensive in that they require both elaborate machinery and extensive manual labor, and are accompanied by problems related to both agglomeration of the pellets, and actual quality control relative to the concentration of powder in the finished product.

It has been discovered, however, that chewing gum base and other thermoplastic materials may be handled and shipped without the use of a powder coating and without substantial risk of agglomeration, cold flow, fusing, or without elaborate refrigeration techniques according to the process of this invention. The process of this invention entails pelletizing the hot viscous melt and cooling the pellets in a liquid medium, forming a slurry thereof. The slurry is then conveyed to containers for shipment or to tank cars if desired. At the point of use the pellets need only be separated from the liquid medium by straining and conveyed wet to a blender for formulation into, for example, a chewing gum composition. The quantity of water retained on the surface of the pellets may be measured and accounted for in the chewing gum formulation process.

Therefore, by utilizing a hydraulic transfer of the pellets from the point of manufacture to the point of use, pellets for formulation into chewing gum base may be provided without the initial steps of drying and powdering and without the machinery associated therewith. In addition, chewing gum base has a typical specific gravity of about 1.02 and therefore, the buoyancy of the pellets in a liquid such as water, will minimize the tendency to deform due to the weight of pellets within a container, and the liquid medium itself serves as a lubricant to avoid the tendency of the tacky pellets to stick to each other.

Accordingly, it is an object of this invention to provide an efficient and inexpensive method for handling and shipping thermoplastic materials.

It is another object to provide an efficient method for transporting pellets of chewing gum base wherein a slurry is formed of a cooling liquid medium after pelletizing and the liquid-pellet slurry is itself conveyed to the point of use by a shipping container, railroad tank car or the like.

It is still another object to provide a method for shipping and handling pelletized chewing gum base which will avoid the tendency of said pellets to stick together when subjected to ambient temperature conditions.

It is still another object of this invention to provide a method wherein the chewing gum base formulation is extruded and pelletized and a liquid slurry of said pellets transpoted to the point of use where the pellets are separated by straining and blended into a chewing gum formulation without the necessity for intermediate steps of drying, powdering, or refrigerating.

These and other objects of this invention will become readily apparent with reference to the drawings and following description wherein.

For the purposes of illustrating the process of this invention, the process as applied to chewing gum base will be described. This description is not intended to limit the scope of this invention to chewing gum base, but is intended to be illustrative only in that the invention may be applied to any thermoplastic material susceptible to pelletization which may be difficult to transship due to agglomeration, cold flow or tackiness.

Figure 1:
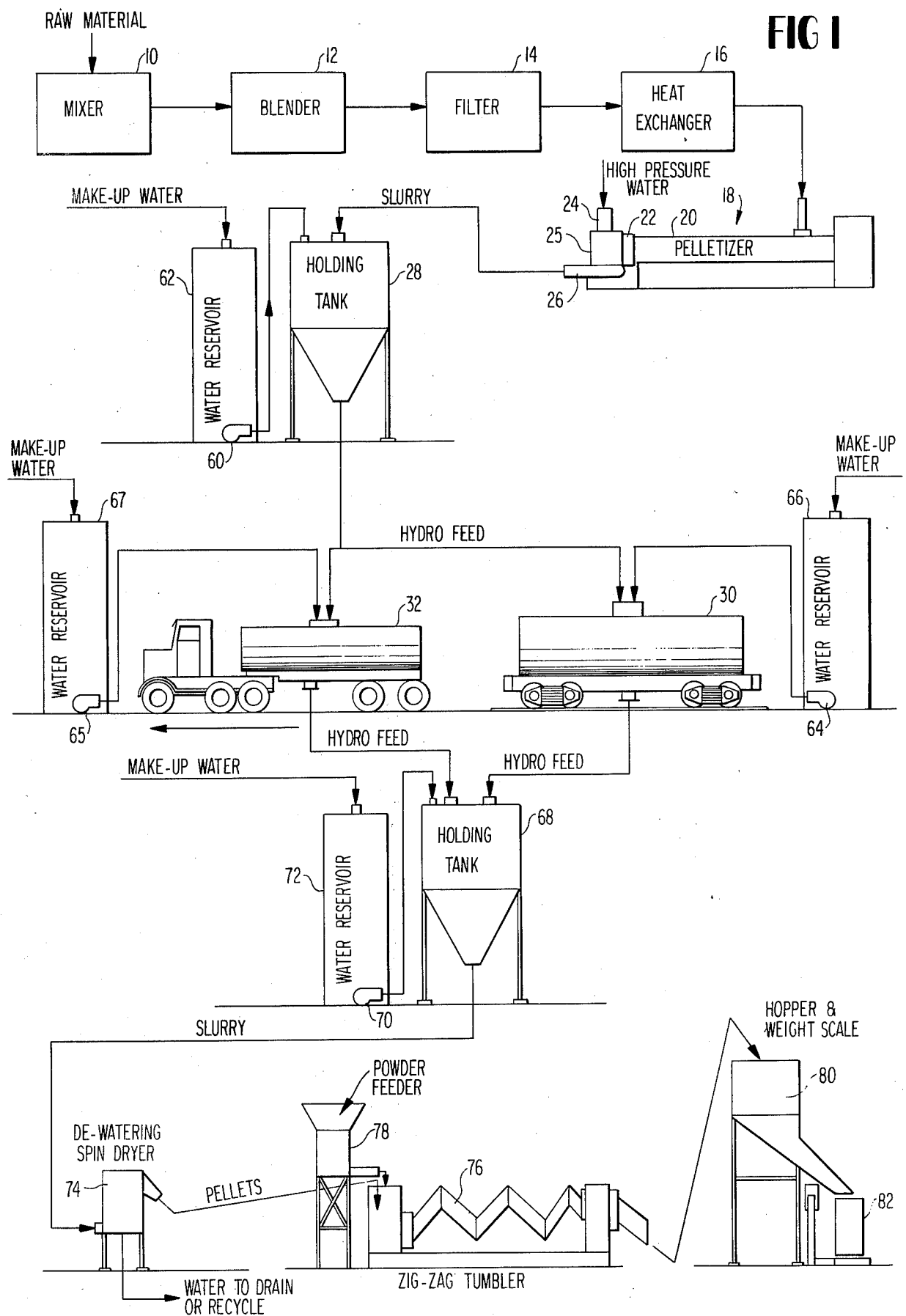
FIG. 1 is a schematic representation of the process of this invention whereby thermoplastic materials are pelletized and transported in a slurry from the manufacturer to the end user.

With reference to FIG. 1, conventional chewing gum bases are formulated from elastomers, natural gums and natural or synthetic rubbers admixed with a variety of resins, waxes and mineral adjuvants. Natural gums normally are chicle or jelutong and the resins may include polyvinyl acetate and polyterpenes. These materials may be combined with petroleum waxes, certain natural waxes, glycerol esters of rosin, and the like.

In the chewing gum base manufacturing process, the raw materials are initially mixed and melted in a conventional mixer 10 and subsequently transported to a blender 12 where the materials are blended. The hot viscous melt from the blender 12 is then filtered at a filter 14. The viscous melt normally is delivered at a temperature of about 250° F. to, for example, a scraped surface heat exchanger 16.

Heat exchanger 16 is designed to lower the temperature of the melt to approximately 140° F. whereby the melt is cooled to the point where it is form retaining and suitable for extrusion into pellets. In a scraped surface heat exchanger, the molten base passes through one or more tubes surrounded by cold fluid. The interior of the tube is continually scraped by circulating blades to prevent the buildup of an insulating layer of cooled base along the surface of the heat transfer wall.

Scraped surface heat exchangers are commercially available for example through VOTATOR DIV., Chemetron Corp., P. O. Box 43, Louisville, Ky. 40201.

When the molten gum base has been cooled to a form retaining temperature of around 140° F. it is conveyed to a pelletizer 18. Any conventional pelletizer will be acceptable, however, in the preferred version of this invention, the base is extruded through a barrel 20 to a pellet cutting head 22 wherein the extruded material is cut into pellets preferably of a size range of ⅛ inch to ½ inch in diameter. As the pellets are formed by head 22, a slurry is formed in chamber 25 by a water stream under high pressure passing through inlet 24 and chamber 25. The newly formed pellets and water slurry then exit (chamber 25) at outlet 26 and are conveyed hydraulically to a holding tank 28, where final pellet concentration is adjusted to 40–60% depending upon size and shape of pellets.

Holding tank 28, located on the premises of the chewing gum base manufacturer, serves to accumulate pellets which are then transferred from the tank to containers for shipment. These containers may be railroad tank cars 30 or tank trucks 32 as illustrated in FIG. 1, or bulk shipping containers (not shown), or the like. Pellets may likewise be pumped directly to railroad tank cars or tank truck trailers without intermediate storage.

For shipping purposes, it is preferred that the concentration of pellets in water range from 40 to 60%, by weight. The water level should be adjusted within the container or, tank or freight car so that the water level just covers the top layer of pellets to provide the maximum buoyant force to prevent pellet adhesion. As is obvious to those skilled in the art, economics will dictate using the minimum amount of water necessary to prevent adhesion of the pellets.

Transportation of the pellets in the form of a slurry from for example the holding tank to containers for transportation preferably should be achieved without utilizing a slurry pump whereby the pellets will be abraded by the pump impeller. In the case of thermoplastic pellets of chewing gum base, wax, or the like which are maintained at temperatures above freezing, contact with impeller blades could result in jamming the pump with fused pellets.

Figure 2:
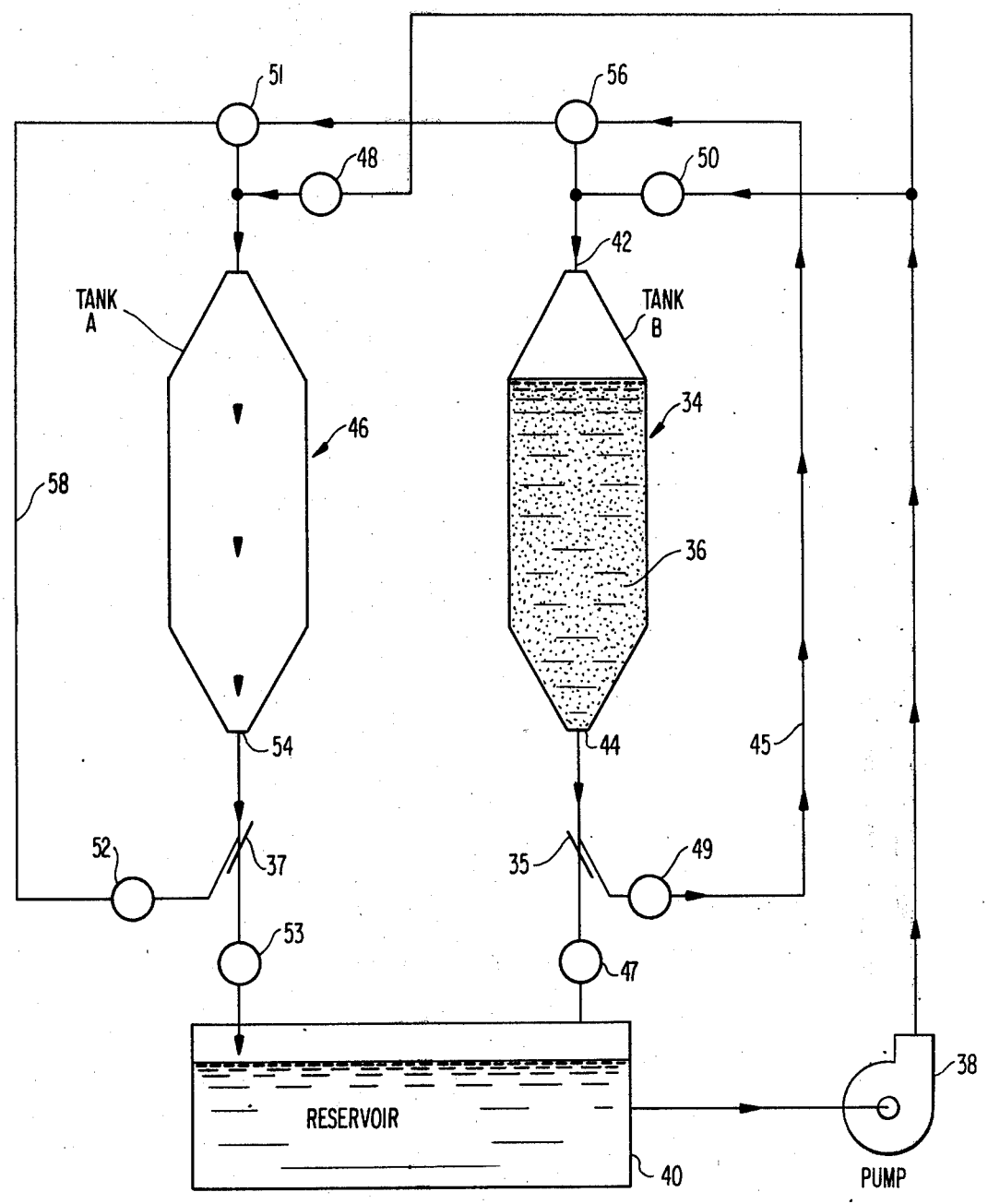
FIG. 2 is a schematic illustration showing transport of a slurry of pellets from one tank to another without passing said slurry through a pump.

However, with attention to FIG. 2, it has been discovered that a slurry of thermoplastic pellets may be transported hydraulically by simple and expeditious procedure that does not require the use of a slurry pump or the like. If a storage tank or holding tank 34 contains a slurry of for example chewing gum base pellets 36, a high pressure water pump 38 pumping water from a reservoir 40 into an inlet 42 in tank 34 will force the slurry 36 from tank 34 at the outlet 44, through line 45 and into a second tank 46.

This procedure requires that valves 47 and 48 are closed and valves 49 and 50 are open. In addition, two-way valve 51 would be directing the slurry in line 45 into tank 46. Valves 52 and 53 at the outlet 54 of tank 46 would be closed, although valve 53 would be utilized to drain excess water from receiving tank 46 into the reservoir 40. A straining screen 37 prevents passage of pellets into reservoir. The procedure may be reversed by closing valve 50 and opening valves 48 and 52 and re-directing two-way valves 51 and 56 to convey the contents of tank 46 through line 58 to tank 34.

Accordingly, with reference to FIG. 1, utilizing the procedure outlined with reference to FIG. 2, the contents of holding tank 28 may be transferred either to tank car 30, tank truck 32, or other container (not shown) by high pressure pump 60 utilizing water from reservoir 62 as the driving force.

When the tank container 30 or 32 arrives at the customer user end-point, the slurry may be transferred therefrom through action of for example high pressure pumps 64 or 65 with water from reservoirs 66 or 67 as the transfer medium to remove the slurry material to a holding tank 68 on the premises of the customer, chewing gum manufacturer.

When chewing gum base material is needed, the manufacturer then may utilize a high pressure pump 70 and water from yet another reservoir 72 to force the contents of the holding tank to a de-watering spinner 74. It will be obvious that any of a variety of different straining devices commercially available may be utilized to separate the water from the entrained pellets therein. The water used as the transport medium may be recycled to for example reservoir 72 for reuse if desired.

FIG. 1 shows the preferred method of de-watering which entails spin drying. It is not necessary that the surface of the pellets be absolutely dry. Uniform treatment of the pellets will render the weight of the water remaining on the surface a calculable value so that the net weight of chewing gum base may be calculated for purposes of formulation.

If desired, the pellets from the spin drying may then be conveyed directly to a blender (not shown) for formulation into a chewing gum composition with for example sugar, flavor oils, and the like according to well known procedures. In the alternative, the pellets may be powdered at the customer chewing gum manufacturer's factory by pneumatically conveying, for example, pellets from the spin drying 74 to, for example, a zig-zag tumbler 76 wherein a measured quantity of powder from a storage container 78 is admixed with a measured quantity of pellets and tumbled through the mixer tumbler 76. The individual pellets here receive a coating of a powder to prevent adhesion, agglomeration, and the like until the pellets are actually blended into chewing gum composition.

It should be noted that thermoplastic pellets are coated with a powder which is acceptable in the end product formulation. For example for chewing gum, the most common powders used are calcium carbonate, or talc. If the powder is not an acceptable ingredient in the end product, the powdering step could not be utilized, and pellets could not be shipped or stored dry. This invention would be the only known method for handling such material in a pelletized state.

After the pellets have received a powder coating in tumbler 76, they are pneumatically conveyed to a hopper and weigh scale 80 which is adapted to dispense a measured quantity of the coated pellets for formulation into a chewing gum composition. Hopper 80 would then dispense a pre-selected weight of pellets into container 82 which would then be transferred to a blender (not shown) for blending with flavor, sugar, corn syrup, and other ingredients utilized to formulate chewing gum composition. The blended composition, would then be sheeted, scored, and wrapped in the conventional fashion.

In summary then, the process of this invention is a greatly improved method of transporting chewing gum base from the point of manufacturer to the customer user who incorporates the base into a chewing gum composition. The process of this invention provides a method for handling said base without problems associated with agglomeration or adhesion of pellets to each other and to the container or without problems associated with the casting and shipment of large blocks of said base. In the process of this invention, the hot viscous melt of chewing gum base is cooled sufficiently to retain its form and then pelletized by extrusion into a pellet cutting head. The pellets are then conveyed by a high pressure water stream, and cooled while being conveyed, away from the head, into a holding tank for transport in a large container such as a tank car or tank truck. The pellets have a specific gravity of about 1.01 typically, and are incorporated in the containers in a range preferably from 40 to 60% by weight, pellets. The buoyancy of the pellets then in the water medium eliminates the likelihood of adhesion, cold flow, or the like, even at room temperature. At the end point, the customer then conveys the pellet slurry to a strainer for de-watering, and the pellets are ready for incorporation into the chewing gum composition.

It has also been discovered that the pellet slurry may be conveyed without the use of the slurry pump and without substantial abrasion or damage to the pellets. The process of this invention includes hydraulic transport of the slurry by pressure exerted thereon. The pressure is supplied by a pump communicating with a water reservoir. The slurry itself however does not pass through the pump but is forced by water therefrom through conduits.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced herein.

What is claimed and desired to be secured by United States Letters Patent is:

1. In a process for handling and transporting thermoplastic material in bulk, which material exhibits adhesive and agglomerative characteristics at ambient or higher temperature, the improvement comprising:
   providing pelletizing means having an inlet for receiving thermoplastic material and an outlet for expelling pellets formed therefrom;
   providing a source of water or other fluid under a high pressure in communication with said pelletizing means at the outlet therefrom;
   pelletizing said material in said means and simultaneously entraining said pellets in water from said source to form a slurry of said pellets in said water;
   providing a water tight bulk shipping container;
   conveying said slurry to said container and admitting said slurry into said container;
   adjusting the concentration of the slurry in said container so that said pellets are present in a concentration of about 40 to 60%, by weight, and are covered with water whereby said pellets may be transported as a slurry in said container to eliminate agglomeration thereof during shipping.

2. The process of claim 1 further comprising pelletizing said material to form pellets having a diameter of about $\frac{1}{8}$ to $\frac{1}{2}$ inches.

3. The process of claim 1 wherein the step of pelletizing said material further comprises extruding said material and directing said extrusion through a pellet forming diehead to cut said extrusion into pellets.

4. The process of claim 3 wherein said material is chewing gum base and said material enters said extruder at a temperature of about 140° F.

5. The process of claim 4 wherein said chewing gum base is blended as a hot viscous melt and subsequently cooled to a temperature of about 140° F. before said material is pelletized.

6. The process of claim 5 further comprising providing a scraped surface heat exchanger and conveying said hot viscous melt therethrough to cool said melt to a temperature of about 140° F. for extrusion.

7. The method of claim 1 further comprising conveying said slurry into a holding tank having an inlet and an outlet in communication in said shipping container;
   providing a source of water;
   conveying said slurry from said tank into said container by pumping water into said tank to force said slurry through the outlet therein and into said container.

* * * * *